(12) United States Patent
Barber et al.

(10) Patent No.: US 8,322,120 B1
(45) Date of Patent: Dec. 4, 2012

(54) FLY BLANKETS FOR HORSES

(76) Inventors: Linda Barber, New Castle, IN (US); Beverly Micomonaco, Franklin, OH (US)

( * ) Notice: Subject to any disclaimer, the term of this patent is extended or adjusted under 35 U.S.C. 154(b) by 383 days.

(21) Appl. No.: 12/572,072

(22) Filed: Oct. 1, 2009

Related U.S. Application Data

(63) Continuation-in-part of application No. 12/178,205, filed on Jul. 23, 2008, now abandoned.

(60) Provisional application No. 60/951,378, filed on Jul. 23, 2007.

(51) Int. Cl.
*B68C 5/00* (2006.01)
(52) U.S. Cl. .......................................................... 54/79.1
(58) Field of Classification Search .................. 54/79.1, 54/79.2, 79.4, 66; 119/850
See application file for complete search history.

(56) References Cited

U.S. PATENT DOCUMENTS

| | | | |
|---|---|---|---|
| 448,151 A * | 3/1891 | Kinder | 54/79.1 |
| 2,850,860 A * | 9/1958 | Torell et al. | 54/79.2 |
| 5,271,211 A | 12/1993 | Newman | |
| 6,003,290 A | 12/1999 | Hsi-Chang | |
| 6,009,693 A | 1/2000 | Hsi-Chang | |
| D423,737 S | 4/2000 | MacGuinness | |
| 6,318,054 B1 | 11/2001 | Gatto | |
| 6,508,205 B1 | 1/2003 | Zink | |
| 7,178,320 B2 * | 2/2007 | Mattioni | 54/66 |
| 7,243,485 B2 | 7/2007 | Donahue | |
| 2003/0159410 A1 * | 8/2003 | Van Campenhoudt | 54/79.1 |

* cited by examiner

*Primary Examiner* — Rob Swiatek

(57) ABSTRACT

A fly blanket for laying atop a horse's rump behind a saddle comprising a mesh sheet having a generally rounded trapezoidal shape; two attachment components both for attaching the mesh sheet to a saddle ring disposed on the saddle; and stitched binding disposed along edges of the mesh sheet, wherein a weighted rope is disposed in all of or a portion of the stitched binding, wherein the weighted rope functions to help keep the fly blanket from flopping around while the horse is moving.

6 Claims, 4 Drawing Sheets

FLY BLANKETS FOR HORSES

CROSS REFERENCE

The present application claims benefit to U.S. Provisional Patent Application Ser. No. 60/951,378, filed Jul. 23, 2007 and U.S. patent application Ser. No. 12/178,205 filed Jul. 23, 2008 (now abandoned), the disclosures of which are incorporated in their entirety herein by reference.

FIELD OF THE INVENTION

The present invention is directed to a covering such as a blanket for covering the rump of a horse. More particularly, the present invention is directed to a mesh blanket that can be secured in place to cover the horse's rump, even when the horse is trotting or cantering.

BACKGROUND OF THE INVENTION

Horse riding is a popular pastime and sport and has spawned a vast market of horse tack and associated accoutrements and accessories. Horses naturally attract horse flies, which are attracted to the smell and sweat of the horse. Flies often make a horse swish its tail, kick, and/or stomp its feet, not only irritating the horse but interfering with the enjoyment of the ride for the rider. Bites can also cause large welts, which may seem disfiguring from a showmanship standpoint. As one attempt to alleviate such problems, some riders have placed a towel over the horse's rump to prevent horse flies from biting, but the towels have not stayed in place.

Any feature or combination of features described herein are included within the scope of the present invention provided that the features included in any such combination are not mutually inconsistent as will be apparent from the context, this specification, and the knowledge of one of ordinary skill in the art. Additional advantages and aspects of the present invention are apparent in the following detailed description and claims.

DESCRIPTION OF PREFERRED EMBODIMENTS

Figure 1:
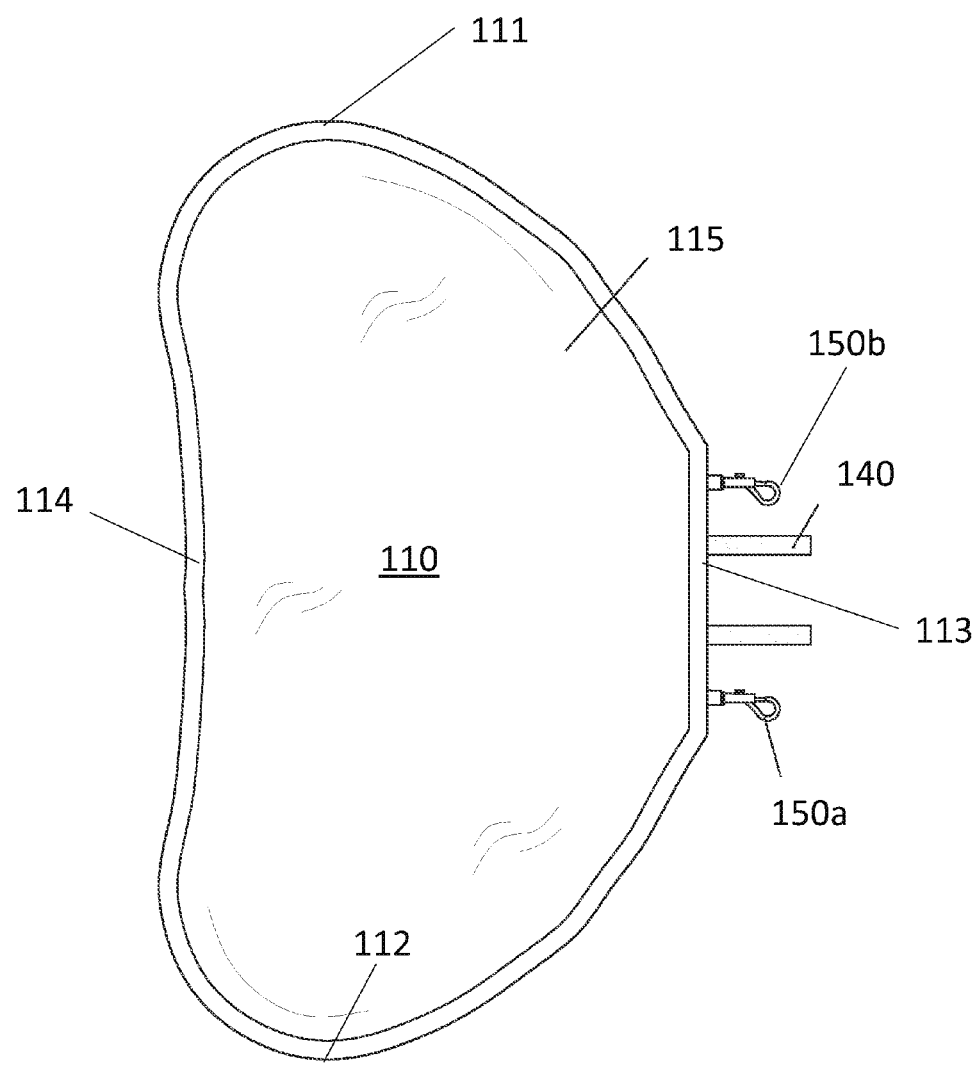
FIG. 1 is a top view of the fly blanket of the present invention.
Figure 1:
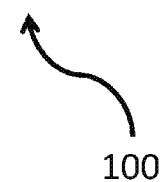
Figure 2:
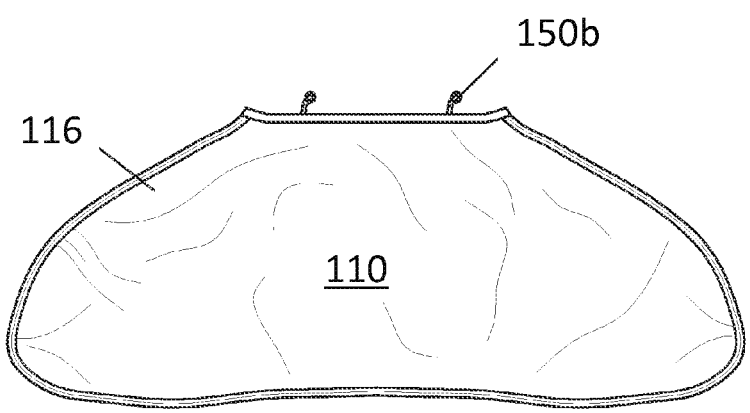
FIG. 2 is a bottom view of the fly blanket of the present invention.
Figure 3:
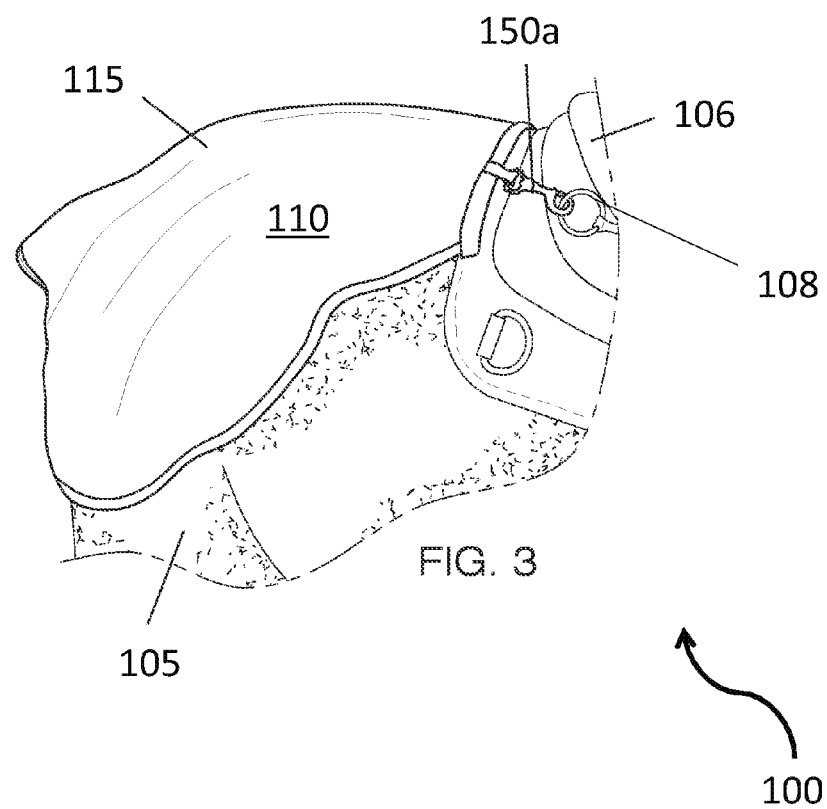
FIG. 3 is a first perspective view of the fly blanket of FIG. 1 as attached to a horse.
Figure 4:
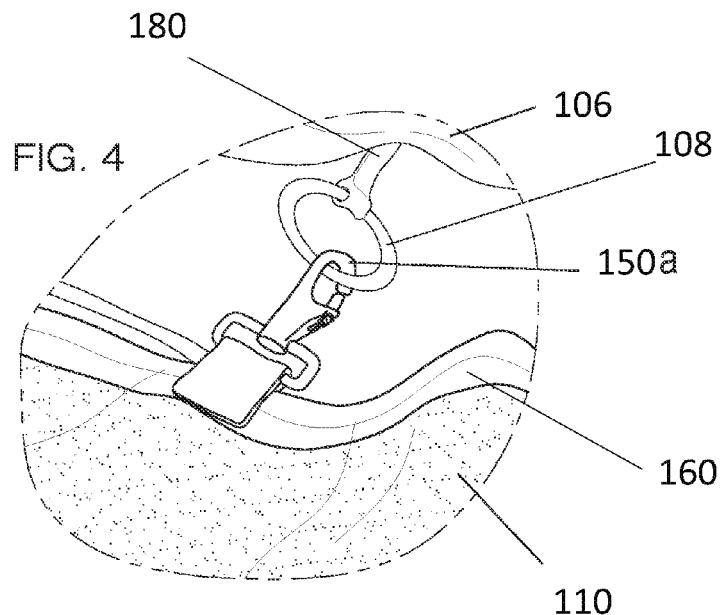
FIG. 4 is a detailed view of a portion of the fly blanket of FIG. 3.
Figure 5:
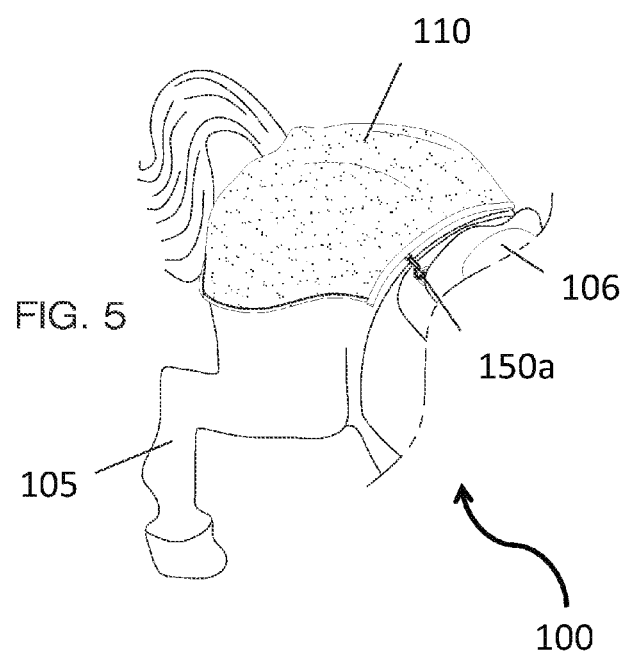
FIG. 5 is a second perspective view of the fly blanket of FIG. 1 as attached to a horse.
Figure 6:
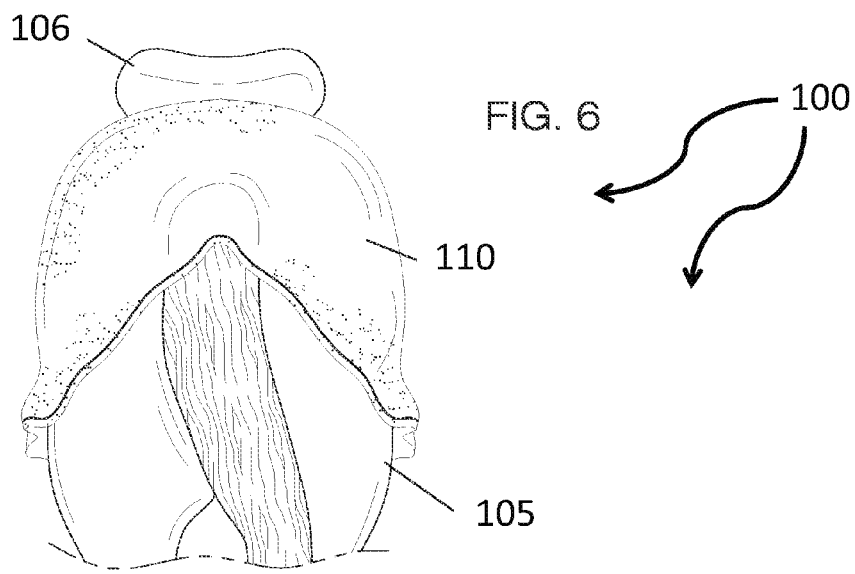
FIG. 6 is a back view of the fly blanket of FIG. 1 as attached to a horse.
Figure 7:
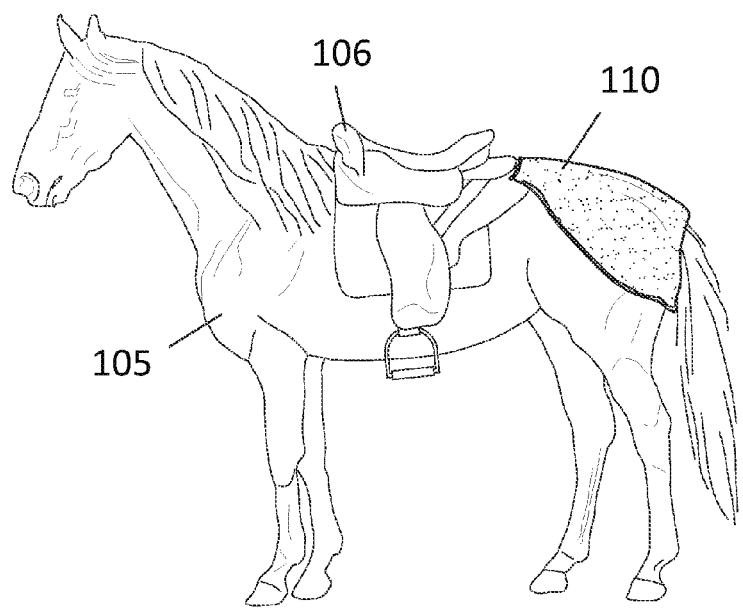
FIG. 7 is a side view of the fly blanket of FIG. 1 as attached to a horse.

Referring now to FIGS. 1-7, the present invention features a fly blanket 100 for covering a rump of a horse 105. Without wishing to limit the present invention to any theory or mechanism, it is believed that the fly blanket 100 of the present invention is advantageous because it can help prevent flies from biting the horse 105. In addition, the fly blanket 100 can stay secured in place on the horse 105. This can provide a more comfortable ride for the horse and the rider.

The fly blanket 100 comprises a mesh sheet 110 having a first side edge 111, a second side edge 112, a front edge 113, a back edge 114, a top surface 115, and a bottom surface 116. The mesh sheet 110 may be shaped to fit comfortably around the horse's rump. For example, the mesh sheet 110 is generally trapezoidal in shape having rounded edges (see FIG. 1.). In some embodiments, the mesh sheet 100 is generally oval in shape. In some embodiments, the back edge 114 of the mesh sheet 110 is curved inwardly slightly to help accommodate the shape of the horse's rump.

The mesh sheet 110 is laid atop the rump of the horse 105 with the bottom surface 116 of the mesh sheet 110 contacting the horse and the front edge 113 of the mesh sheet 110 facing the saddle 106. The mesh of the mesh sheet 110 can help allow sweat from the horse to evaporate, which may help keep the horse cool.

Disposed on the mesh sheet 110 (e.g., on the front edge 113, on the first side edge 111, on the second side edge 112, on the top surface 115, on the bottom surface 116, on the back edge 114) is a first attachment component 150a. In some embodiments, a second attachment component 150b is disposed on the mesh sheet 110 (e.g., on the front edge 113, on the first side edge 111, on the second side edge 112, on the top surface 115, on the bottom surface 116, on the back edge 114). The first attachment component 150a and/or second attachment component 150b may include a clasp mechanism, a hook mechanism, a hook-and-loop fastener mechanism, a button mechanism, a snap mechanism, the like, or a combination thereof. The first attachment component 150a and/or second attachment component 150b are for attaching the mesh sheet 110 to the saddle 106. The attachment components 150a and 150b may be constructed from a variety of materials including but not limited to steel, brass, nickel (or nickel-plated), plastic, the like, or a combination thereof.

In some embodiments, the first attachment component 150a and/or second attachment component 150b engage a saddle ring 108 on the saddle 106 (e.g., on the back edge of the saddle 106). A saddle ring 108 (e.g., a ring, a D-ring, etc.) may not be a standard feature of a saddle 106 and therefore must be affixed to the saddle 106. In some embodiments, the saddle ring 108 is stitched onto the saddle 106 via a saddle attachment means 180, for example straps (e.g., rawhide straps), chains, etc.

In some embodiments, a third attachment component 140 is disposed on the mesh sheet 110 (e.g., on the front edge 113, on the first side edge 111, on the second side edge 112, on the top surface 115, on the bottom surface 116, on the back edge 114). The third attachment component 140 may include a string, a hook-and-loop fastener, the like, or a combination thereof. The third attachment component 140 may engage the saddle ring 108 or another portion of the saddle 108. In some embodiments, the fly blanket 100 further comprises more than three attachment components.

The mesh sheet 110 may be constructed from a variety of materials and in a variety of colors/designs. In some embodiments, the mesh sheet 110 is constructed from a material comprising vinyl, fiberglass, the like, or a combination thereof. Both vinyl and fiberglass are available in various weights. For example, the mesh sheet 110 may be constructed from a material comprising Textilene® from Twitchell Corp. (Dothan, Ala.) such as Textiline Item No. T13, which is a woven fabric using 0.025" diameter vinyl-coated 1000 denier polyester core yarn.

In some embodiments, stitched binding 160 (or webbing) is disposed along a portion of the edges (e.g., first side edge 111, second side edge 112, front edge 113, back edge 114) of the mesh sheet 110 or all of the edges of the mesh sheet 110. As an example, in some embodiments, stitched binding 160 (or webbing) may include Model No. 560A medium weight webbing from American Cord & Webbing (Woonsocket, R.I.). The stitched binding 160 may be attached to the mesh sheet 110 via stitching, an adhesive, the like, or a combination thereof.

One or more weighted ropes 170 may be used to help keep the fly blanket 100 from flopping around while the horse 105 is moving (e.g., trotting, cantering, running). The weighted rope 170 may be disposed inside the stitched binding 160. For example, the stitched binding 160 may be wrapped around the weighted rope 170. The weighted rope 170 may be along a portion of the edges of the mesh sheet 110 or along all of the edges of the mesh sheet 110. As an example, in some embodiments, the weighted rope 170 is DW35 (drapery weight) weighted tape from Textol Systems Inc. (Carlstadt, N.J.).

The fly blanket 100 and the components thereof may be constructed in a variety of sizes. For example, the thickness of the stitched binding 160 (or webbing) may vary. In some embodiments, the thickness of the stitched binding 160 (or webbing) is between about 0.01 to 0.1 inches (e.g., 0.055"). In some embodiments the thickness of the stitched binding 160 (or webbing) is between about 0.1 to 0.5 inches.

In some embodiments, the weighted rope is between about 0.25 to 0.5 inches in diameter. In some embodiments, the weighted rope is between about 0.5 to 0.75 inches in diameter. In some embodiments, the weighted rope is between about 0.75 to 1 inches in diameter. In some embodiments, the weighted rope is between about 1 to 2 inches in diameter.

As used herein, the term "about" refers to plus or minus 10% of the referenced number. For example, an embodiment wherein the weighted rope is about 2 inches in diameter includes a weighted robe that is between 1.8 and 2.2 inches in diameter.

Various modifications of the invention, in addition to those described herein, will be apparent to those skilled in the art from the foregoing description. Such modifications are also intended to fall within the scope of the appended claims. Each reference cited in the present application is incorporated herein by reference in its entirety.

Although there has been shown and described the preferred embodiment of the present invention, it will be readily apparent to those skilled in the art that modifications may be made thereto which do not exceed the scope of the appended claims. Therefore, the scope of the invention is only to be limited by the following claims.

What is claimed is:

1. A fly blanket for laying atop a horse's rump behind a saddle, said fly blanket comprising:
   (a) a mesh sheet having a generally rounded trapezoidal shape;
   (b) a first attachment component and a second attachment component both for attaching the mesh sheet to a saddle ring disposed on the saddle, wherein both attachment components are disposed on a front edge of the mesh sheet; and
   (c) stitched binding disposed along edges of the mesh sheet, wherein a weighted rope is disposed in all of or a portion of the stitched binding, the weighted rope functions to help keep the fly blanket from flopping around while the horse is moving.

2. The fly blanket of claim 1, wherein a back edge of the mesh sheet is curved inwardly slightly to help accommodate the horse's rump.

3. The fly blanket of claim 1 wherein the first attachment component or the second attachment component is a clasp mechanism, a hook mechanism, a hook-and-loop fastener mechanism, a button mechanism, a snap mechanism, or a combination thereof.

4. The fly blanket of claim 1 further comprising a third attachment component disposed on the mesh sheet for helping to attach the mesh sheet to the saddle.

5. The fly blanket of claim 4, wherein the third attachment component includes a string, a hook-and-loop fastener, or a combination thereof.

6. The fly blanket of claim 1, wherein the saddle ring is attached to the saddle via a strap.

* * * * *